United States Patent
Yamaoka et al.

(10) Patent No.: US 7,332,914 B2
(45) Date of Patent: Feb. 19, 2008

(54) CONDUCTOR INSPECTION APPARATUS AND CONDUCTOR INSPECTION METHOD

(75) Inventors: Shuji Yamaoka, Fukuyama (JP); Akira Nurioka, Fukuyama (JP); Mishio Hayashi, Saitama (JP); Shogo Ishioka, Hiroshima (JP)

(73) Assignee: OHT Inc., Hiroshima (JP)

( * ) Notice: Subject to any disclaimer, the term of this patent is extended or adjusted under 35 U.S.C. 154(b) by 0 days.

(21) Appl. No.: 10/547,355

(22) PCT Filed: Feb. 27, 2004

(86) PCT No.: PCT/JP2004/002348

§ 371 (c)(1),
(2), (4) Date: Feb. 27, 2006

(87) PCT Pub. No.: WO2004/076966

PCT Pub. Date: Sep. 10, 2004

(65) Prior Publication Data

US 2006/0226851 A1   Oct. 12, 2006

(30) Foreign Application Priority Data

Feb. 28, 2003   (JP) .............................. 2003-102227

(51) Int. Cl.
*G01R 31/08* (2006.01)
*G01R 31/302* (2006.01)

(52) U.S. Cl. ....................... 324/522; 324/527; 324/750

(58) Field of Classification Search ................ 324/527, 324/522, 750

See application file for complete search history.

(56) References Cited

U.S. PATENT DOCUMENTS 4,272,822 A * 6/1981 Yasuhara et al. ............. 73/718
5,424,633 A * 6/1995 Soiferman ................ 324/158.1
6,353,327 B2 * 3/2002 Nishikawa ................. 324/758

FOREIGN PATENT DOCUMENTS

| GB | 2143954 A | * | 2/1985 |
| JP | 56-36002 | | 4/1981 |
| JP | 58-21104 | | 2/1983 |
| JP | 06-109413 | | 4/1994 |
| JP | 2001-108402 | | 4/2001 |

* cited by examiner

*Primary Examiner*—Anjan Deb
*Assistant Examiner*—Amy He
(74) *Attorney, Agent, or Firm*—Westerman, Hattori, Daniels & Adrian, LLP.

(57) ABSTRACT

Disclosed is a conductor inspection apparatus capable of detecting a state of an inspection-target electric conductor with a high degree of accuracy in a non-contact manner. The inspection apparatus includes a signal supply section 510 for supplying an inspection signal to an inspection-target conductor 520, and two sensor plates 570, 580 disposed approximately parallel to each other in the vicinity of the conductor 520. The inspection apparatus is designed to inspect a configuration of the conductor 520 disposed opposed to the sensor plate 570, in accordance with a measured signal level from the sensor plate 570. The inspection apparatus further includes a subtracter 550 for subjecting respective detected signal values from the sensor plates 570, 580 to subtraction, and a divider 560 for dividing the detected signal value from a selected one of the sensor plates by the subtraction result to normalize the detected signal value from the selected sensor plate so as to detect a relative ratio between the detected signal values from the sensor plates to obtain a value X corresponding a distance between the selected sensor plate and the conductor 520, as a detection result.

8 Claims, 4 Drawing Sheets

CONDUCTOR INSPECTION APPARATUS AND CONDUCTOR INSPECTION METHOD

TECHNICAL FIELD

The present invention relates to a conductor inspection apparatus and a conductor inspection method capable of inspecting a state of an inspection-target conductor applied with an AC signal.

BACKGROUND ART

In a manufacturing process for a circuit board having a conductive pattern formed thereon, it is necessary to inspect the presence of a defect, such as disconnection or short circuit, in the conductive pattern formed on the circuit board.

Heretofore, as a technique for inspecting a conductive pattern, there has been known a contact (pin contact) technique which comprises binging a plurality of pins into contact with first and second opposite ends of a conductive pattern, supplying an electric signal from the pins in contact with the first end to the conductive pattern, and receiving the electric signal from the pins in contact with the second end, so as to inspect continuity or other quality factor of the conductive pattern, as disclosed, for example, in the following Patent Publication 1. In this technique, a certain current serving as the electric signal is supplied to the conductive pattern from a plurality of metal pin probes which are put on respective end terminals of the conductive pattern.

The pin contact technique based on the pin probe set in direct contact with the end terminals has an advantage of being able to achieve a high S/N ratio.

Patent Publication 1: Japanese Patent Laid-Open Publication No. 62-269075

However, the direct contact of the pins is likely to cause a problem about damages in a conductive pattern, particularly in a circuit wiring pattern formed on a glass board for use in a liquid-crystal display panel, which has a small pattern thickness and a low fixing strength relative to the board.

Further, in an inspection of an electronic component, such as a liquid-crystal panel for portable phones, where the wiring pitch of a conductive pattern becomes finer and finer, a number of pin probes having a fine pitch have to be prepared by consuming a great deal of time and cost.

In addition, the pin probe set has to be newly prepared for each circuit board (inspection target) having a conductive pattern different in configuration. This leads to increase in inspection cost, resulting in major hindrance to cost reduction of electronic components.

Particularly, when a plurality of wiring patterns are not formed independently but connected with each other, as in wiring patterns for use in a liquid-crystal panel, many of the conductive patterns are in a short-circuited state from a circuitry standpoint. Thus, any appropriate inspection apparatus for this type of circuit pattern has not been put into practical use.

DISCLOSURE OF THE INVENTION

In view of the above problems, it is an object of the present invention to provide an inspection apparatus and method capable of inspecting a pattern configuration in any types of circuit patterns, and detecting a state of an inspection target with a high degree of accuracy in a non-contact manner.

In order to achieve this object, the present invention provides the following measures.

According to a first aspect of the present invention, there is provided a conductor inspection apparatus which comprises a signal supply plate positioned apart from an inspection-target conductor by a given distance and adapted to apply an AC signal to the inspection-target conductor, a plate-shaped sensor plate made of an electrically-conductive material and adapted to detect an inspection signal from the inspection-target conductor applied with the AC signal from the signal supply plate, level measurement means for measuring a signal level which is detected by the sensor plate under the condition that the inspection-target conductor is capacitively coupled with the sensor plate, and determination means for determining a state of the inspection-target conductor in accordance with the signal level measured by the level measurement means.

In the conductor inspection apparatus set forth in the first aspect of the present invention, the determination means may be operable to determine a configuration of the inspection-target conductor on the basis of the detected signal level from the sensor plate.

Further, the determination means may be operable, when the signal level measured by the level measurement means is greater than a given level, to determine that the inspection-target conductor has an excessively large area in an inspection-target region, and, when the signal level measured by the level measurement means is less than the given level, to determined that the inspection-target conductor has an excessively small area at least in the inspection-target region.

The conductor inspection apparatus set forth in the first aspect of the present invention may include two of the sensor plates positioned approximately parallel to one another. In this case, the level measurement means may be operable to measure respective signal levels detected from the inspection-target conductor by the two sensor plates, and the determination means may be operable to determine a position of the inspection-target conductor relative to a selected one of the sensor plates in accordance with a relative ratio between respective values of the detected signal levels from the sensor plates.

Further, the determination means may be operable to divide the signal level value measured from the selected sensor plate by a subtraction result of respective signal level values measured from the two sensor plates, to determine a position of the inspection-target conductor relative to the selected sensor plate in accordance with the division result.

According to a second aspect of the present invention, there is provided a conductor inspection method for use in a conductor inspection apparatus adapted to allow each of a signal supply plate and a sensor plate made of an electrically-conductive material to be positioned apart from an inspection-target conductor by a given distance. The conductor inspection method comprises supplying an AC signal to the signal supply plate to apply the AC signal to the inspection-target conductor, capacitively coupling the inspection-target conductor with the sensor plate and detecting an inspection signal from the inspection-target conductor applied with the AC signal from the signal supply plate, and determining a state of the inspection-target conductor in accordance with the detected signal level.

In the conductor inspection method set forth in the second aspect of the present invention, the state of the inspection-target conductor may be a configuration of the inspection-target conductor.

Further, the conductor inspection method may include, when the detected signal level is greater than a given level, determining that the inspection-target conductor has an excessively large area in an inspection-target region, and, when the detected signal level is less than the given level, determining that the inspection-target conductor has an excessively small area at least in the inspection-target region.

When the conductor inspection apparatus includes two of the sensor plates positioned approximately parallel to one another, the conductor inspection method set forth in the second aspect of the present invention may include measuring respective signal levels detected from the inspection-target conductor by the two sensor plates, and determining a position of the inspection-target conductor relative to a selected one of the sensor plates in accordance with a relative ratio between respective values of the detected signal levels from the sensor plates.

Further, the conductor inspection method may include dividing the signal level value measured from the selected sensor plate by a subtraction result of respective signal level values measured from the two sensor plates, to determine a position of the-inspection-target conductor relative to the selected sensor plate in accordance with the division result.

BEST MODE FOR CARRYING OUT THE INVENTION

With reference to the drawings, an embodiment of the present invention will now be described in detail.

A conductor inspection apparatus according to an embodiment of the present invention is designed such that a signal level in an inspection-target region supplied with an inspection signal (e.g. AC signal) is detected by a sensor plate made of an electrically-conductive material under the condition that the sensor plate is capacitively coupled with the inspection-target region, and a configuration of a conductor located in the inspection-target region is determined in accordance with detected signal level so as to inspect the quality of the conductor or the presence of a defect in the conductor.

The conductor inspection apparatus may include two of the sensor plates positioned approximately parallel to one another. In this case, the conductor inspection apparatus may be designed to calculate a ratio between respective values of signal levels detected from an inspection-target conductor by the two sensor plates, and determine a position of the inspection-target conductor in accordance with the calculated ratio.

Figure 1:
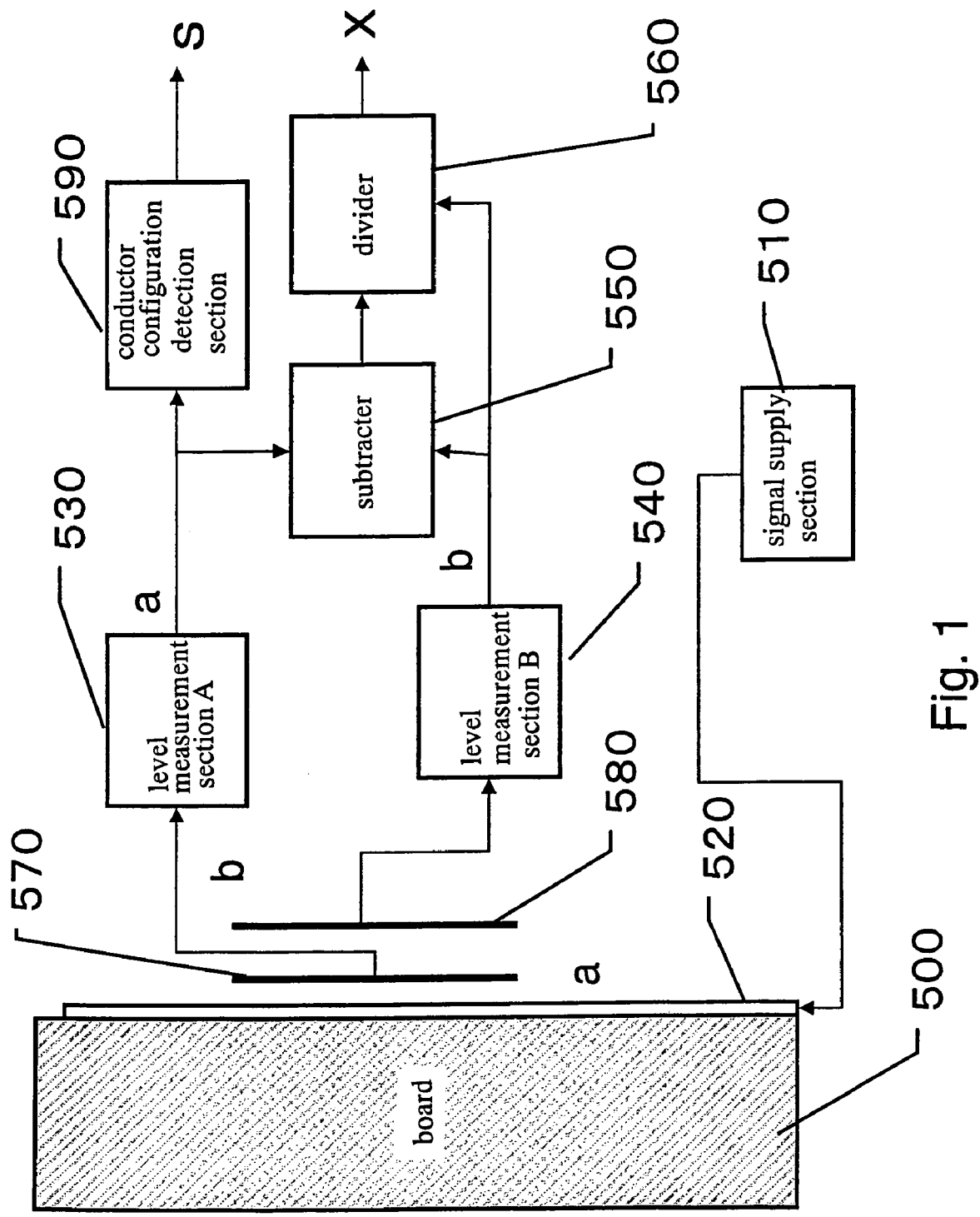
FIG. 1 is an explanatory block diagram showing a conductor inspection apparatus according to one embodiment of the present invention.

With reference to FIG. 1, one embodiment of the present invention will be described in detail below. FIG. 1 is an explanatory block diagram showing a conductor inspection apparatus according to the embodiment of the present invention.

In FIG. 1, the reference 500 indicates a substrate or board to be inspected. For example, the board 500 has a surface formed with a wiring pattern, which serves as an inspection-target region. The reference numeral 510 indicates a signal supply section for supplying an inspection signal to an inspection-target conductor 520 which is a part of the wiring pattern. For example, the signal supply section 510 is designed to generate an AC signal having a frequency of 1 kHz or more and a peak-to-peak voltage of 20 Vp-p, and supply the AC signal to the inspection-target conductor 520.

While the following description will be made on the assumption that this AC signal is used as an inspection signal, an inspection signal to be used in this embodiment is not limited to such an AC signal, but may be any other suitable signal. Preferably, the inspection signal is set to have a frequency of 100 KHz or more.

As to a method for supplying an inspection signal from the signal supply section 510 to the conductor 520, it is not limited to a specific method, but any suitable method may be used in this embodiment. For example, the signal supply section may be connected directly to a portion of the conductor 520 to supply the inspection signal. Alternatively, an electric conductor plate may be disposed apart from the conductor 520 by a given distance to supply the inspection signal through a capacitive coupling formed therebetween. Alternatively, a coil may be provided at an end of the signal supply section to supply the inspection signal through an electromagnetic coupling formed between the end of the signal supply section and the conductor 520.

While the inspection-target conductor 520 in this embodiment is a wiring pattern formed on the surface of the board to be inspected, it may be any electric conductor, such as a conductive wire or a conductive metal piece, other than a conductive pattern formed on a board.

The reference numeral 530 indicates a level measurement section A for measuring a detected signal level from a sensor plate a 570, and the reference numeral 540 indicates a level measurement section B for measuring a detected signal level from a sensor plate b 580.

For example, each of the level measurement section A 530 and the level measurement section B 540 may be designed to detect a peak within a given time frame and determine a measured level in accordance with the detected peak, or to obtain respective detected levels of the sensor plate a 570 and the sensor plate b 580 at the same timing and determine a measured level in accordance with the obtained detected levels.

The reference numeral 550 indicates a subtracter for calculating a difference (subtraction result) between a measured level at the level measurement section A 530 and a measured level at the level measurement section B 540. The reference numeral 560 indicates a divider for dividing a measured value from the level measurement section B 540 by the subtraction result at the subtracter 550.

Each of the sensor plate a 570 positioned closer to the conductor 520 and the sensor plate b 580 positioned further away from the conductor 520 is made of an electrically conductive material. The sensor plate a 570 and the sensor plate b 580 are fixedly positioned approximately parallel to one another.

When only a configuration of the conductor is inspected instead of measuring a distance between the conductor 520 and either one of the sensor plates 570, 580 as described later, either one of the level measurement sections, the subtracter 550 and the divider 560 may be omitted.

Figure 2:
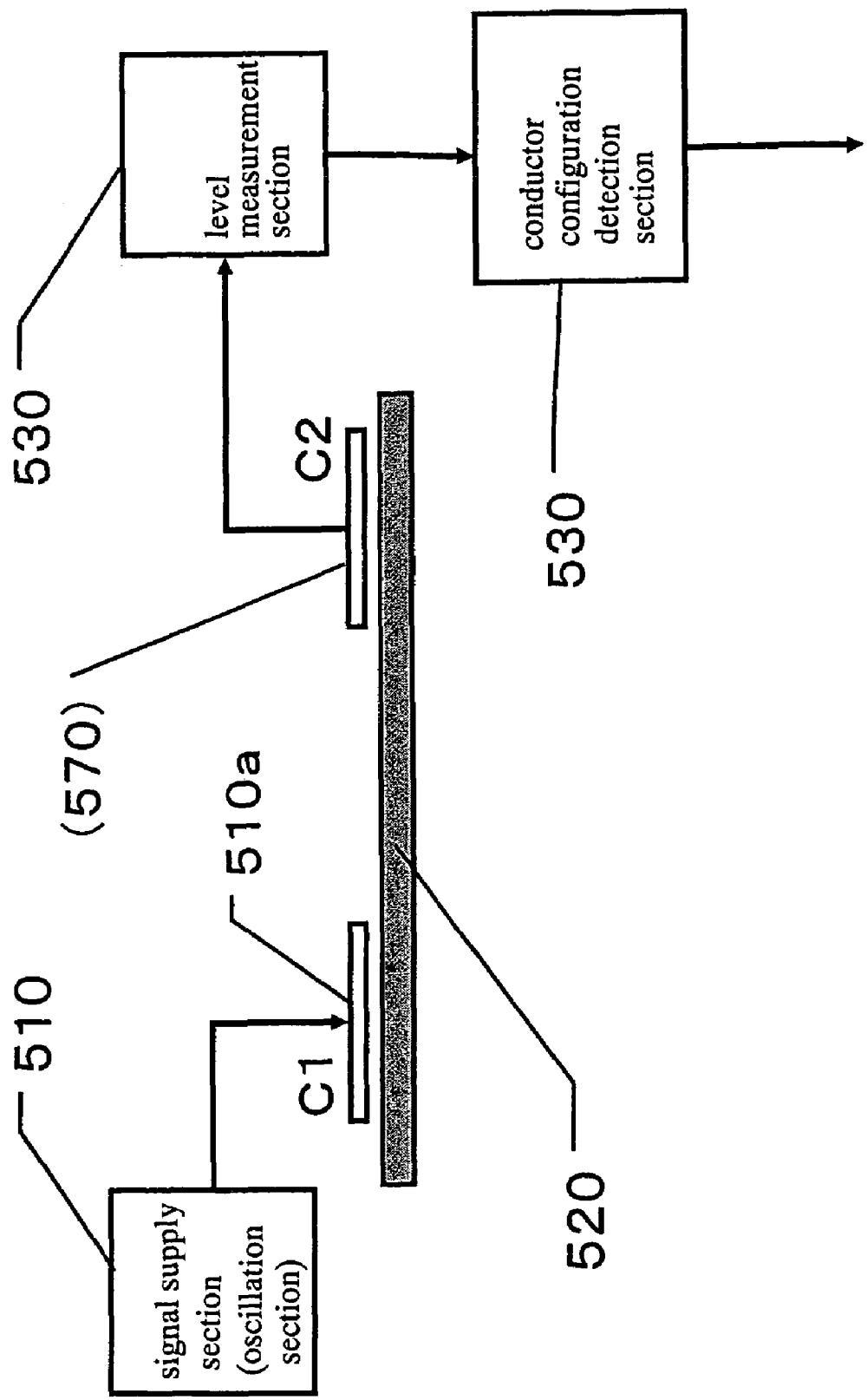
FIG. 2 is an explanatory block diagram of the principle of measuring a state of an inspection-target conductor using the conductor inspection apparatus according to the embodiment of the present invention.
Figure 3:
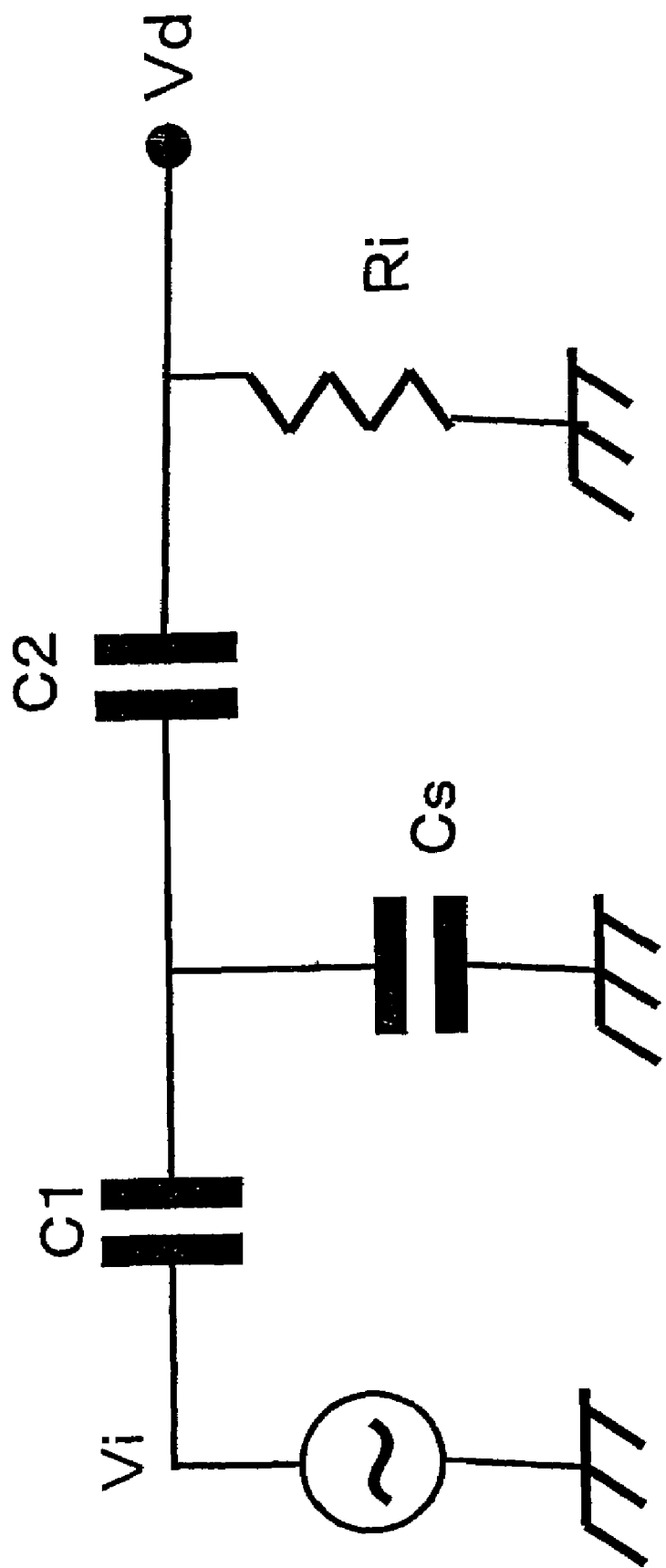
FIG. 3 is a diagram showing one example of an equivalent circuit of the conductor inspection apparatus in FIG. 2.
Figure 4:
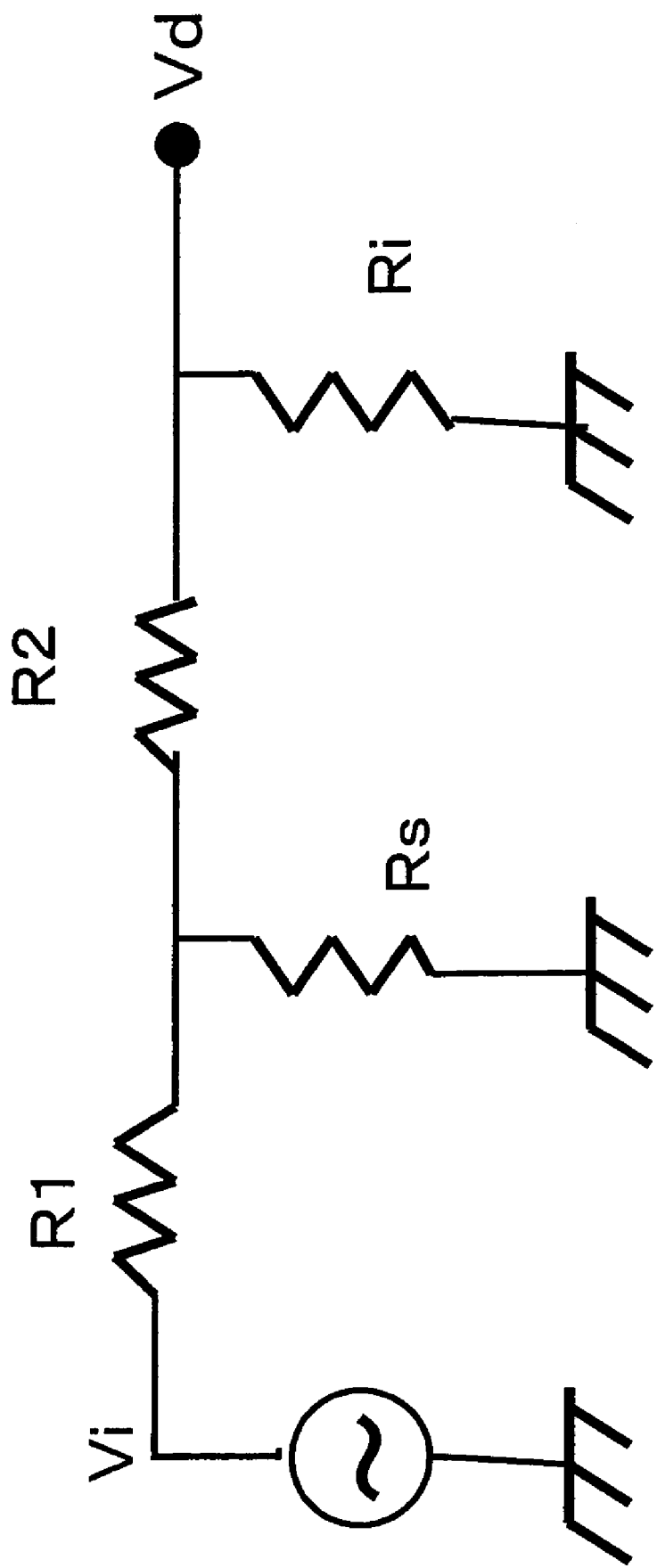
FIG. 4 is a diagram showing a modified equivalent circuit of the equivalent circuit in FIG. 3.

With reference to FIGS. 2 to 4, the principle of measuring a state of the inspection-target conductor using the above conductor inspection apparatus according to the embodiment of the present invention will be described below. FIG. 2 is an explanatory block diagram of the measurement principle of the conductor inspection apparatus. FIG. 3 is a diagram showing one example of an equivalent circuit of the conductor inspection apparatus in FIG. 2, and FIG. 4 is a diagram showing one modification of the equivalent circuit in FIG. 3.

In the conductor inspection apparatus illustrated in illustrated in FIG. 2, a signal supply plate 510a is positioned apart from the conductor 520 by a given distance in the vicinity of one end of the conductor 520 in such a manner as to capacitively couple the signal supply plate 510a with the conductor 520, and an inspection signal is supplied from the signal supply section 510 to the conductor 520 through the capacitive coupling. In FIG. 2, given that a capacitance between the signal supply plate 510a and the conductor 520 is C1, and a capacitance between the conductor 520 and the sensor plate is C2.

Further, given that an opposed area between the signal supply plate 510a and the conductor 520 is S1, and a distance between the signal supply plate 510a and the conductor 520 is d1, the capacitance (capacitor value) C1 between the signal supply plate 510a and the conductor 520 in the air can be expressed by the following formula 1:

$$C1 = 8.85 \times 10^{-12} \, (S1/d1) \quad (1)$$

In the same way, given that an opposed area between the conductor 520 and the sensor plate is S2, and a distance between the conductor 520 and the sensor plate is d2, the capacitance (capacitor value) C2 between the conductor 520 and the sensor plate in the air can be expressed by the following formula 2:

$$C2 = 8.85 \times 10^{-12} \, (S2/d2) \quad (2)$$

Further, given that an output impedance of the signal supply section 510 is 0 (zero); a stray capacitance of the conductor 520 is Cs; and an input impedance of the level measurement section 530 is Ri, the conductor inspection apparatus can be expressed by an equivalent circuit as shown in FIG. 3.

In FIG. 3, Vi is a supply voltage of an inspection signal supplied from the signal supply section, and Vd is a detected voltage to be sent to the level measurement section 530.

In this equivalent circuit, if an oscillating frequency of the signal supply section 510 has a constant value $f_0$ (preferably set to be less than 100 KHz), respective impedances of the capacitors C1, C2, C3 will be the following constant values:

$$Rs = (1/2\pi f_0 Cs).$$

Thus, the equivalent circuit in FIG. 3 can be modified as shown in FIG. 4.

The detected voltage Vd can be calculated from the equivalent circuit in FIG. 4 as follows:

$$Vd = (Ri \, Rs \, Vi)/(R1+Rs)(R2+Ri)$$

Therefore, if each value in the above formula is maintained in a stable state, the detected voltage Vd can have a stable value.

Based on the above principle, a conductor configuration detection section 590 is designed to determine that an inspection-target conductor has an abnormal configuration, when a detected value of the inspection-target conductor is not in a given reference range which is pre-set based on a voltage Vd detected from the conductor 520 having a normal configuration.

That is, this conductor inspection apparatus is designed to determine that an inspection-target conductor has a normal configuration, when a measured signal level at the level measurement section 530 is in a given range, and to determine that an inspection-target conductor has an abnormal configuration, when a measured signal level at the level measurement section 530 is not in the given range.

As described above, the conductor inspection apparatus according to this embodiment can reliably detect abnormality in configuration of an inspection-target conductor in a non-contact manner relative to the inspection-target conductor. Specifically, if the conductor is partly broken or disconnected (e.g. a wiring pattern is in an open state), a detected signal level will have a lower value.

If the conductor is partly short-circuited (e.g. a wiring pattern is in a short state), a detected signal level will have a higher value.

In the above inspection, if each of the distances between the inspection-target conductor 520 and the sensor plate and between the signal supply plate 510a and the inspection-target conductor 520 can be controllably maintained at a constant value, the accuracy of the inspection will be drastically improved. For this purpose, as shown in FIG. 1, the conductor inspection apparatus according to this embodiment is provided with the two sensor plates 570, 580, the subtracter 550 and the divider 560, and designed to directly measure a distance between the conductor 520 and a selected one of the sensor plates.

The principle of directly measuring a distance between the conductor 520 and a selected one of the sensor plates will be described below.

Given that a measurement result at the level measurement section A 530 and a measurement result at the level measurement section B 540 are, respectively, Va and Vb, (1/Va) has a value proportional to a distance between the sensor plate a 570 and the conductor 520, and (1/Vb) has a value proportional to a distance between the sensor plate b 580 and the conductor 520.

A distance "d" between the sensor plate a 570 and the sensor plate b 580 can be considered to be equivalent to a value derived by subtracting a distance between the conductor 520 and the sensor plate a 570 positioned closer to the conductor 520, from a distance between the conductor 520 and the sensor plate b 580 positioned further away from the conductor 520. Thus, the distance "d" between the sensor plates has a value proportional to (1/Vb)−(1/Va), and thereby the following formula is satisfied: (1/Vb)−(1/Va)∝d.

An inverse $1/\{(1/Vb)-(1/Va)\}$ of the (1/Vb)−(1/Va) can be considered to be an actually measured voltage level corresponding to "d", and the calculation of Va/[1/{(1/Vb)−(1/Va)}] is equivalent to the normalization of Va based on "d". Thus, an inverse of this formula can be considered to be a value proportional to a distance between the sensor plate a 570 and the conductor 520.

That is, 1/<Va/[1/{(1/Vb)−(1/Va)}]>has a value proportional to a distance between the sensor plate a 570 and the conductor 520, and this formula can be simplified as follows:

$$1/<Va/[1/\{(1/Vb)-(1/Va)\}]>=[1/\{(1/Vb)-(1/Va)\}]/Va$$
$$= \{(Va \times Vb)/(Va-Vb)\}/Va$$
$$= Vb/(Va-Vb)$$

This formula is achieved by the subtracter 550 and the divider 560 in FIG. 1, and an output X of the divider 560 has a value proportional to a distance between the sensor plate a 570 and the conductor 520.

This value X is based on a relative value of respective detected signal levels of the sensor plate a 570 and the sensor plate b 580. Thus, even if an inspection signal value introduced into the conductor 520 has variations, the influence of the variations can be cancelled out.

Thus, a detection result corresponding to a distance between the conductor 520 and the sensor plate a 570 can be obtained with a high degree of accuracy.

That is, a detection result can be obtained with a high degree of accuracy by determining a reference value from a pre-measurement result corresponding to a distance between the conductor and a selected one of the sensor plates, and comparing a value X detected during an actual measurement with the reference value.

In the above conductor inspection apparatus, the sensor plate a 570 is located between the sensor plate b 580 and the conductor 520, and a detected signal level at the sensor plate b 580 is likely to be reduced due to interposition of the sensor plate a 570. However, a rate of the reduction will never be changed, because the sensor plate a 570 electrically connected to the level measurement section A 530 is in a high impedance state. Thus, the configuration illustrated in FIG. 1 can cancel out the influence of the interposition of the sensor plate a 570 to eliminate a measurement error.

That is, even if any object, such as a conductive material, a dielectric material or an insulating material, is interposed between the sensor plate and the conductor 520, except that the object is in a low-impedance shielded state relative to the ground, the inspection apparatus in FIG. 1 can reliably obtain a measurement result X corresponding to a distance between the conductor 520 and a selected one of the sensor plates. This makes it possible to apply the inspection apparatus to inspection of various devices.

In addition, the inspection apparatus in FIG. 1 has no restriction on supplying an inspection signal, because even if an inspection signal level to be supplied to the conductor has variations, a ratio to be obtained as a detection result will not be changed. Thus, any of the aforementioned inspection supply methods may be applied to this inspection apparatus.

INDUSTRIAL APPLICABILITY

As mentioned above, the present invention can provide a conductor inspection apparatus and method capable of detecting a state of an inspection-target electric conductor with a high degree of accuracy in a non-contact manner.

What is claimed is:

1. A conductor inspection apparatus comprising:
 a signal supply plate positioned apart from an inspection-target conductor by a given distance and adapted to apply an AC signal to said inspection-target conductor;
 two plate-shaped sensor plates made of an electrically-conductive material and adapted to detect respective inspection signals from said inspection-target conductor applied with the AC signal from said signal supply plate, said two plate shaped sensor plates being positioned approximately parallel to one another;
 level measurement means for measuring respective signal levels which are detected from said inspection target conductor by said two sensor plates under the condition that said inspection-target conductor is capacitively coupled with said two sensor plates; and
 determination means for determining a state of said inspection-target conductor in accordance with a signal level of one of the sensor plates measured by said level measurement means,
 wherein said determination means is operable to determine a position of said inspection-target conductor relative to a selected one of said sensor plates in accordance with a relative ratio between respective values of the detected signal levels from said sensor plates.

2. The conductor inspection apparatus as defined in claim 1, wherein said determination means is operable to determine a configuration of said inspection-target conductor on the basis of a signal level detected from one of said sensor plates.

3. The conductor inspection apparatus as defined in claim 2, wherein said determination means is operable, when one of the respective signal levels measured by said level measurement means is greater than a given level, to determine that said inspection-target conductor has an excessively large area in an inspection-target region, and, when the one of the respective signal levels measured by said level measurement means is less than said given level, to determine that said inspection-target conductor has an excessively small area at least in said inspection-target region.

4. The conductor inspection apparatus as defined in claim 1, wherein said determination means is operable to divide the signal level value measured from said selected sensor plate by a subtraction result of respective signal level values measured from said two sensor plates, to determine a position of said inspection-target conductor relative to said selected sensor plate in accordance with said division result.

5. A conductor inspection method for use in a conductor inspection apparatus including a signal supply plate and two sensor plates made of an electrically-conductive material and positioned approximately parallel to each other, comprising:
 supplying an AC signal to said signal supply plate to apply said AC signal to said inspection-target conductor;
 capacitively coupling said inspection-target conductor with said two sensor plates;
 detecting respective inspection signals from said inspection-target conductor applied with the AC signal from said signal supply plate with said two sensor plates;
 measuring respective signal levels detected from said inspection-target conductor by said two sensor plates;
 determining a state of said inspection-target conductor in accordance with a signal level detected by one of said two sensor plates; and
 determining a position of said inspection-target conductor relative to a selected one of said sensor plates in accordance with a relative ratio between respective values of the detected signal levels from said sensor plates.

6. The conductor inspection method as defined in claim 5, wherein said state of said inspection-target conductor is a configuration of said inspection-target conductor.

7. The conductor inspection method as defined in claim 6, further comprising:
 when one of the respective signal levels measured by said level measurement means is greater than a given level, determining that said inspection-target conductor has an excessively large area in an inspection-target region; and
 when one of the respective signal levels measured by said level measurement means is less than said given level, determining that said inspection-target conductor has an excessively small area at least in said inspection-target region.

8. The conductor inspection method as defined in claim 5, further comprising:
 dividing the signal level value measured from said selected sensor plate by a subtraction result of respective signal level values measured from said two sensor plates, to determine a position of said inspection-target conductor relative to said selected sensor plate in accordance with said division result.

* * * * *